(12) United States Patent
Haddad

(10) Patent No.: US 8,804,619 B2
(45) Date of Patent: Aug. 12, 2014

(54) METHODS FOR ASSIGNING RADIO RESOURCES FOR MOBILE DEVICES CONNECTED TO A MOBILE COMMUNICATION MODULE AND RELATED SYSTEMS AND DEVICES

(75) Inventor: Wassim Haddad, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 432 days.

(21) Appl. No.: 13/198,605

(22) Filed: Aug. 4, 2011

(65) Prior Publication Data
US 2012/0275392 A1 Nov. 1, 2012

Related U.S. Application Data

(60) Provisional application No. 61/479,793, filed on Apr. 27, 2011.

(51) Int. Cl.
*H04W 4/00* (2009.01)
(52) U.S. Cl.
USPC .......................... 370/328; 455/440; 455/441
(58) Field of Classification Search
None
See application file for complete search history.

(56) References Cited

U.S. PATENT DOCUMENTS

| | | | |
|---|---|---|---|
| 6,876,642 B1* | 4/2005 | Adams et al. | 370/338 |
| 7,532,604 B2* | 5/2009 | Eglin | 370/338 |
| 8,521,216 B2* | 8/2013 | Morita | 455/550.1 |
| 2005/0086493 A1* | 4/2005 | Ishidoshiro | 713/182 |
| 2005/0259598 A1* | 11/2005 | Griffin et al. | 370/255 |
| 2008/0043692 A1* | 2/2008 | Morita | 370/338 |
| 2009/0073946 A1* | 3/2009 | Morita | 370/338 |

* cited by examiner

*Primary Examiner* — Bob Phunkulh

(57) ABSTRACT

Methods of assigning radio resources in a wireless communications network with user equipment are provided. The methods include connecting a user equipment unit to a vehicle having a mobile communication module associated therewith. The user equipment unit is authenticated at the vehicle and is associated with the user equipment unit with the vehicle. Connection credentials are received at the mobile communication module from the user equipment unit if the user equipment unit is authenticated and associated. At least one wireless interface is activated at the mobile communication module responsive to the received connection credentials. A local wireless connection is established between the user equipment unit and the mobile communication module associated with the vehicle using the at least one wireless interface. Related mobile communication modules and intermediary devices are also provided.

6 Claims, 8 Drawing Sheets

METHODS FOR ASSIGNING RADIO RESOURCES FOR MOBILE DEVICES CONNECTED TO A MOBILE COMMUNICATION MODULE AND RELATED SYSTEMS AND DEVICES

RELATED APPLICATIONS

The present application claims the benefit of priority from U.S. Provisional Application No. 61/479793 entitled "Enabling V2I and V2V" filed Apr. 27, 2011, the disclosure of which is hereby incorporated herein in its entirety by reference.

TECHNICAL FIELD

Various embodiments described herein relate to radio frequency communications and, more particularly, to wireless communications networks and devices, and methods of operating same.

BACKGROUND

In a typical cellular radio system, wireless terminals (also known as mobile stations and/or user equipment units (UEs)) communicate via a radio access network (RAN) to one or more core networks. User equipment units (UEs) may be, for example, mobile telephones ("cellular" telephones), desktop computers, laptop computers, tablet computers, and/or any other devices with wireless communication capability to communicate voice and/or data with a radio access network.

The radio access network covers a geographical area which is divided into cell areas, with each cell area being served by a base station, for example, a radio base station (RBS), which in some networks is also called "NodeB" or, in Long Term Evolution, an eNodeB. A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

In some versions of the radio access network, several base stations are typically connected, for example, by landlines or microwave, to a radio network controller (RNC). The radio network controller, also called abuse station controller (BSC), supervises and coordinates various activities of the base stations connected thereto. The radio network controllers are typically connected to one or more core networks, typically through a gateway.

Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. The Universal Terrestrial Radio Access Network (UTRAN) is essentially a radio access network using wideband code division multiple access for user equipment units (UEs). The Third Generation Partnership Project (3 GPP) has undertaken to evolve further the UTRAN and GSM based radio access network technologies.

Specifications for Evolved Universal Terrestrial Radio Access Network (E-UTRAN) are ongoing within the 3rd Generation Partnership Project (3 GPP). Another name used for E-UTRAN is the Long Term Evolution (LTE) Radio Access Network (RAN). Long Term Evolution (LTE) is a variant of a 3GPP radio access technology wherein the radio base station nodes are connected directly to a core network rather than to radio network controller (RNC) nodes. In general, in LTE the functions of a radio network controller node are performed by the radio base stations nodes. As such, the radio access network of an LTE system has an essentially "flat" architecture comprising radio base station nodes without reporting to radio network controller nodes.

The evolved UTRAN comprises evolved base station nodes, for example, evolved NodeBs or eNBs, providing user-plane and control-plane protocol terminations toward the UEs. The eNB hosts the following functions (among other functions not listed): (1) functions for radio resource management (for example, radio bearer control, radio admission control), connection mobility control, dynamic resource allocation (scheduling); (2) mobility management entity (MME) including, for example, distribution of paging message to the eNBs; and (3) User Plane Entity (UPE), including IP Header Compression and encryption of user data streams: termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers.

The LTE standard is based on multi-carrier based radio access schemes such as Orthogonal Frequency-Division Multiplexing (OFDM) in the downlink and SC-FDMA in the uplink. Orthogonal FDM's (OFDM) spread spectrum technique distributes the data over a large number of carriers that are spaced apart at precise frequencies, This spacing provides the "orthogonality" in this technique which reduces interference. The benefits of OFDM are high spectral efficiency, resiliency to RF interference, and lower multi-path distortion.

As noted above, in the E-UTRAN Radio Access Network scheme, the management of radio resource such as time, frequency and spatial resources takes place in the individual base stations (or cells). Each eNodeB base station therefore includes a Radio Resource Management (RRM) unit for performing management of radio resources. These RRM units typically operate independently from each other, except for very limited exchange of information, such as traffic load condition.

Referring now to FIGS. 1A and 1B, a schematic diagram of a conventional wireless network 10 will be discussed, Referring first to FIG. 1A, in a conventional wireless network 10, a base station 12 communicates with a core network 18 through a gateway 16. Communications between the base station 12 and the gateway 16 are carried over a transport network 20, which may include wired and/or wireless communication links. The base station 12 also communicates with one or more user equipment units (UEs) 14 through a radio access network (RAN) 30. Signals, such as voice and/or data signals, transmitted by the UE 14 are carried over the RAN 30 to the base station 12, and then over the transport network 20 to the gateway 16, for transmission to the core network 18.

As further illustrated in FIGS. 1A and 1B, a conventional wireless network 10 may include a plurality of base stations 12 that provide radio communication services for a plurality of user equipment units (UE) 14 within their respective geographic service areas (cells). Each base station 12 includes an associated RRM unit 24, and each of the base stations 12 communicates with the core network 18 through a gateway 16 via a transport network. At the base stations 12, data received from and to be transmitted to the User Equipment units (UE) 14 is transported to and from the core network 18 through a transport network 20 that may include a variety of transport links 22, such as optical fiber, microwave and/or copper wires.

Conventionally, these various transport links 22 are point to point connections, as shown in FIG. 1B. Each base station 12 generates or consumes a certain amount of data that may vary as traffic condition changes over time. Thus, the point to point links 22 are designed to accommodate the peak data rates a base station generates or consumes.

The output of the RRM unit 24 in a conventional radio access network is a schedule, which typically defines an allocation of time, frequency and/or spatial resources to the UEs 14 in the system, and the Modulation and Coding Scheme (MCS) the given resource can support.

FIG. 2 illustrates hypothetical resource allocation schedules for three different cells, Cell 0, Cell 1 and Cell 2. For clarity of illustration, the spatial dimension is omitted from the schedules shown in FIG. 2. However, it will be appreciated that the spatial dimension could include, for example, a particular sector of a cell in which resources are allocated to a UE 14.

In the example shown in FIG. 2, three frequencies (f1 to f3) and your time slots (TS1 to TS4) are available for allocation to various UEs. For example, in Cell 0, UE0 is allocated frequency f3 for two time slots, TS1 and TS2, and is instructed to use modulation and coding scheme MCS1 within those resources. UE1 is allocated frequency f2 for two time slots, TS1 and TS2, and is instructed to use modulation and coding scheme MCS7 within those resources. UE2 is allocated frequencies f2 and f3 for one time slot, TS3, and is instructed to use modulation and coding scheme MCS2 within those resources, etc.

There is one such resource allocation schedule for the uplink (i.e., for communications from the UE 14 to the base station 12) and another for downlink (i.e., for communications from the base station 12 to the UE 14), since the transport resource for the two link directions is statically allocated in the conventional network.

As long as the transport network links 22 are dimensioned to carry the peak traffic that the base stations 12 in the RAN may generate, the transport and radio access networks operate independently. The designs of the two networks are also disjoint.

In practice, the traffic generated or consumed by base stations 12 may vary over time and locations as users move. Therefore, not all base stations 12 may be operating at a peak rate at a given point in time. The statically dimensioned transport network 20 is not very efficient, as there may be excess capacity that may not be fully utilized at any given time.

Furthermore, when the user equipment (UE) is moving, for example, a UE unit in a vehicle traveling on a road, resources may be assigned to the UE unit by the wireless network 10 upon initial communications and may be reassigned due to movement of the UE. The movement of the UE unit may cause the UE to encounter multiple wireless technologies, for example, 3G/LTE, WLAN, 802.11p and the like, and be required to switch between these various technologies to maintain connectivity, However, current network coverage may lead to intermittent connectivity during movement of the UE unit. Accordingly, improved methods of resource allocation and connectivity for mobile UE units may be desired.

SUMMARY

Some embodiments of the present invention provide methods of assigning radio resources in a wireless communications network with user equipment. The method includes connecting a user equipment unit to a vehicle having a mobile communication module associated therewith. The user equipment unit is authenticated at the vehicle and is associated with the user equipment unit with the vehicle. Connection credentials are received at the mobile communication module from the user equipment unit if the user equipment unit is authenticated and associated. At least one wireless interface is activated at the mobile communication module responsive to the received connection credentials. A local wireless connection is established between the user equipment unit and the mobile communication module associated with the vehicle using the at least one wireless interface.

In some embodiments, a wireless connection can be established between the user equipment unit and a node of the wireless communications network through the mobile communication module associated with the vehicle. This wireless connection can be established using a service provider associated with the user equipment unit, thus, the cost of this connection may be provided on the user's regular statement for the user equipment unit, rather than having a second bill associated with the wireless connections.

Furthermore, in some embodiments, the vehicle having the associated mobile communication module is moving along a path and the mobile communication module is configured to establish wireless connections with at least two network nodes associated with different types of networks along the path. Information may be periodically provided from the mobile communication module to a intermediary device positioned in the wireless communications network. This information may include at least location information associated with the mobile communication module, a speed of the vehicle, and a destination of the vehicle. Thus, the intermediary device may be configured to control connectivity of the mobile communication module to nodes of the wireless communications network along the path. For example, the intermediary device may be configured to pre-provision potential nodes in the wireless communication system on the path to reduce the possibility of intermittent connectivity along the path of the user equipment.

In some embodiments, the intermediary may be configured to detect areas along the path that do not have any type of network coverage and to buffer a predetermined number of packets before the vehicle enters the detected areas so that the connection to the wireless communication system is not interrupted. Thus, embodiments of the present invention may provide improved connectivity of UE when the UE is mobile. As used herein, "mobility" refers to a measure of the extent to which the user equipment is physically moving and is the opposite of "stationary."

Some embodiments discussed herein provide intermediary devices in a wireless communication system. The intermediary device includes a radio transceiver and a processor. The radio transceiver is configured to receive information associated with a mobile communication module associated with a vehicle moving along a path, wherein the information includes at least location information associated with the mobile communication module, a speed of the vehicle, and a destination of the vehicle. The intermediary device is further configured to receive information associated with nodes of the wireless communications network along the path, the information including network traffic information associate with the nodes along the path. The processor may be configured to control connectivity of the mobile communication module to the nodes of the wireless communications network along the path of the vehicle based on the received information associated with the mobile communication module and associated with the nodes along the path. Thus, the intermediary device may pre-provision nodes along the path of the vehicle such that the user of the user equipment will not experience a high level of intermittent connectivity.

Some embodiments discussed herein include mobile communication modules in a wireless communications network. The mobile communication modules are associated with a vehicle. The mobile communication modules include a radio transceiver and a processor. The radio transceiver is configured to receive connection credentials from a user equipment unit plugged into the vehicle if the user equipment unit is authenticated. The processor is configured to activate at least one wireless interface of the mobile communication module responsive to the received connection credentials. The processor is further configured to establish a local wireless connection between the user equipment unit and the mobile communication module associated with the vehicle using the at least one wireless interface.

Other methods, intermediary devices and/or mobile communication modules according to embodiments of the invention will be or become apparent to one with skill in the art upon review of the following drawings and detailed description. It is intended that all such additional methods, intermediary devices and/or mobile communication modules be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of the present invention are directed to providing an improved coverage for user equipment (UE) units that are moving, for example, one or more UE units in a vehicle traveling on a road. As used herein, a "UE" refers to "mobile telephones "cellular" telephones), desktop computers, laptop computers, tablet computers, and/or any other devices with wireless communication capability to communicate voice and/or data with a radio access network."

Figure 1A:
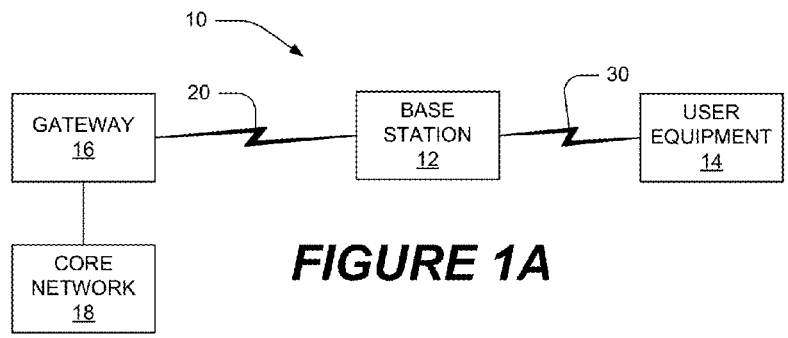
FIGS. 1A and 1B are schematic block diagrams illustrating conventional wireless networks.
Figure 1B:
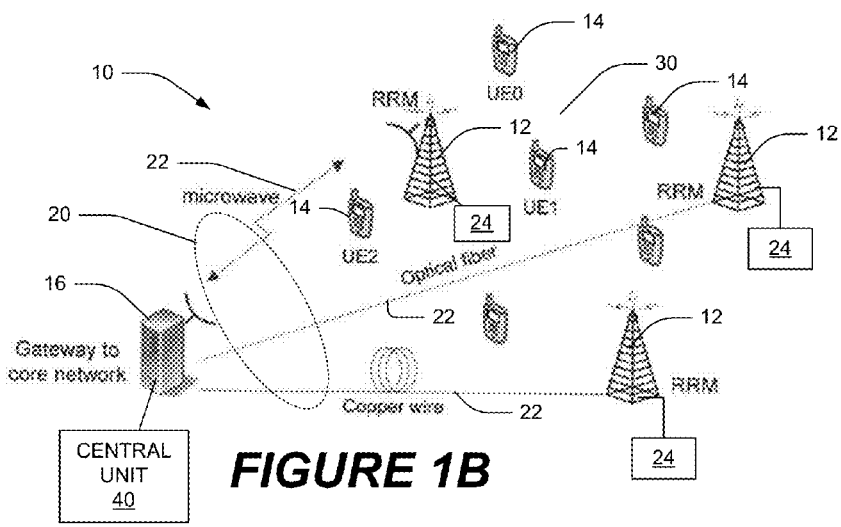
Figure 2:
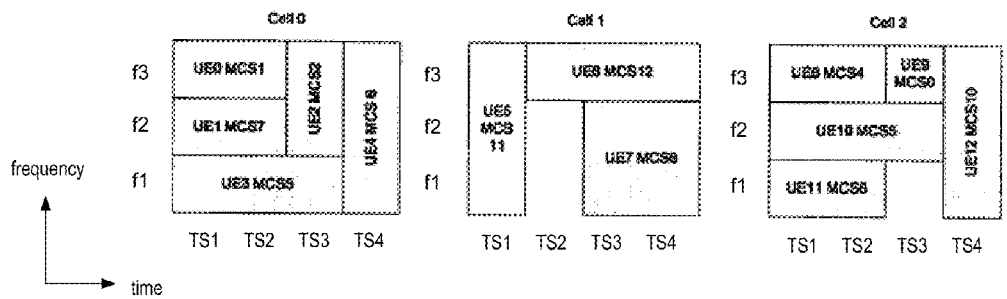
FIG. 2 is a block diagram illustrating hypothetical resource allocation schedules for the wireless networks of FIGS. 1A and 1B.
Figure 3:
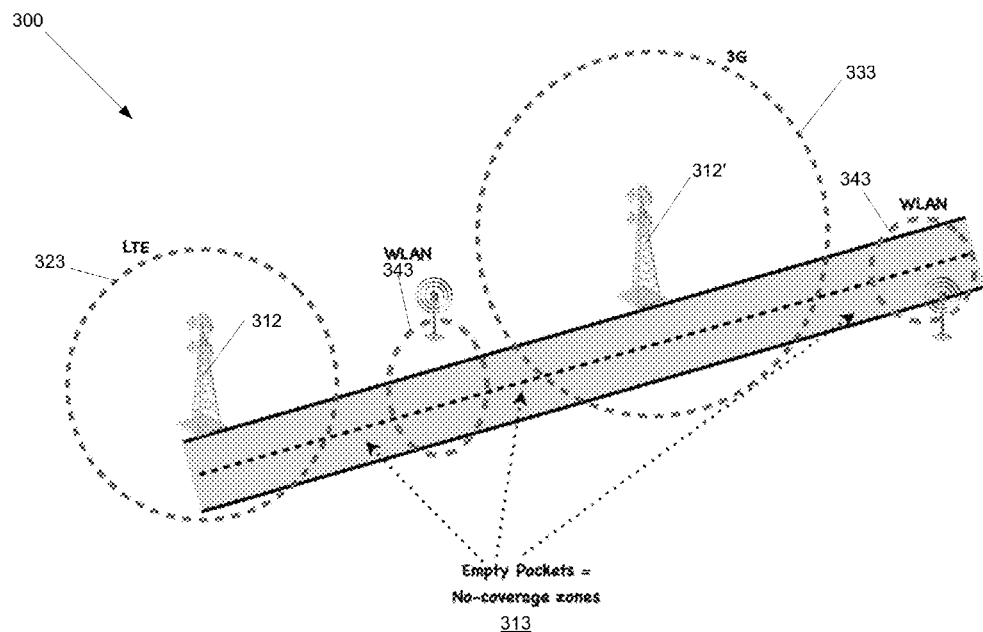
FIG. 3 is a diagram illustrating intermittent connectivity of conventional wireless networks.

As discussed above, in a conventional network, resources may be assigned to the UE unit by a wireless network 10 (FIGS. 1A and 1B) upon initial communications and may be reassigned due to movement of the UE. As illustrated in the diagram of FIG. 3, a UE unit moving on a road may cause the UE unit to encounter multiple wireless technologies in the network 300, for example, 3G 333 associated with radio base station (RBS) 312', Long Term Evolution (LTE) 323 associated with RBS 312, wireless local area network (WLAN) 343, 802.11p (not shown) and the like, and be required to switch between these various technologies to maintain connectivity. As illustrated in FIG. 3, there will likely be empty pockets 313 (no coverage zones) between these wireless technologies 333, 323, 343, which may lead to intermittent connectivity during movement of UE unit on the road.

Accordingly, some embodiments of the present invention provide mobile communication modules associated with a vehicle. The mobile communication module is configured to connect to one or more UE units, for example, mobile terminals, in the vicinity of the mobile communication unit and facilitate the connection of the UE units to the wireless network including the various wireless technologies illustrated in FIG. 3. In some embodiments, the mobile communication module is configured to communicate with an intermediary device that sits between the mobile communication module and the radio base stations 12, 12'. The intermediary device may pre-provision potential nodes in the wireless communication system 300 on the path of the vehicle to reduce, or possibly avoid, loss of connectivity while the vehicle is moving along the path as will be discussed further below with respect to FIGS. 4 through 13.

For purposes of the present description, multiple wireless technologies are expected to be available along the path of the vehicle and the mobile communication module is presumed to switch between these various wireless technologies during the vehicle's progression along the path as illustrated in FIG. 3. Although embodiments of the present invention will be discussed with reference to 3G 333, LTE 323, WLAN 343 and 802.11p wireless technologies, it will be understood that embodiments of the present invention are not limited to these exemplary wireless technologies. Any wireless technology capable of being used in combination with embodiments discussed herein may be used without departing from the scope of the present invention.

For example, throughout this specification, various network technologies will be discussed, such as 3G networks. It will be understood that embodiments of the present invention may be applied to any NG wireless technology, wherein N is any number representing the current wireless generations, for example, "4G."

In accordance with embodiments discussed herein, coverage can be provided by both fixed and mobile infrastructures without departing from the scope of the present invention. It will be further understood that when it is stated that a UE unit is communicating with "a node of the wireless communications network", the "node" of the wireless network may be located in surrounding infrastructure and/or on another vehicle. In other words, embodiments of the present invention are intended to include both vehicle to infrastructure and/or vehicle to vehicle communication.

Figure 4:
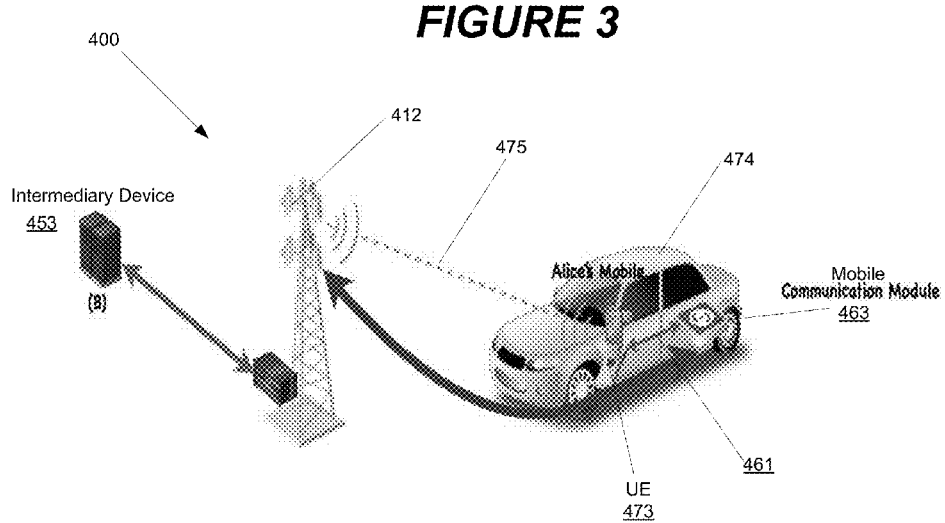
FIG. 4 is a block diagram illustrating a mobile communication module in a wireless network in accordance with some embodiments of the present invention.

Referring now to FIG. 4, a diagram of a system 400 including a mobile communication module 463 in accordance with some embodiments of the present invention will be discussed. As illustrated in FIG. 4, a wireless communications network or system 400 may include a plurality of nodes, such as node 412, that wirelessly communicate with a plurality of user equipment (UE) units, collectively designated herein as 473, according to various embodiments described herein. The system 400 further includes a vehicle 474 having an associated mobile communication module 463 that communicate with the UE 473 over a local wireless connection in accordance with some embodiments of the present invention. The UE units 473 communicate with the nodes 412 through the mobile communication module 463 associated with the vehicle.

The nodes 412 communicate with a core network (18 of FIG. 1A), which itself may be configured to communicate with other nodes 412 and/or to communicate with other communication networks, such as the Public Switched Telephone Network(s) (PSTN), the Internet, and the like. The functionalities of the core network and/or the node(s) 412 may be provided at a single site separate from nodes 412, distributed across different sites separate from nodes 412, distributed among the nodes 412, distributed among the nodes 110 and one or more sites separate from the nodes 412 and the like. A node 412 itself may also be centralized at a single site or distributed among multiple sites. As discussed above, as used herein, "a node" may include another mobile communication module 463 associated with another vehicle, thus, enabling vehicle to vehicle communication.

Operations for assigning radio resources in a wireless communications network 400 with user equipment 473 will now be discussed beginning with FIG. 4. Upon entry into the vehicle 474, a user may connect the user equipment unit 473, for example, a mobile terminal, to the vehicle 474 having the mobile communication module 463 associated therewith. The user equipment unit 473 may run a special application provided by a node 412, which authenticates ($3^{rd}$ party authentication) the vehicle 474 and associates the vehicle 474 with the user equipment unit 473. After the user equipment unit 472 is authenticated and associated, connection credentials are received at the mobile communication module 463 from the user equipment unit. These connection credentials may include, for example, an Internet protocol (IP) address, security credentials and the like. The mobile communication module 463 includes at least one wireless interface and typically multiple wireless interfaces. The at least one wireless interface of the mobile communication module 463 is activated responsive to the received connection credentials. At this point, a local wireless connection 461 can be established between the user equipment unit 473 and the mobile communication module 463 associated with the vehicle 474 using the activated at least one wireless interface. Thus, if the wireless interface is a WLAN interface, the user of the user equipment unit 473 can use WLAN connectivity rather than, for example, LTE, which may consume less battery power and may provide more reliable coverage. A connection (475) can be established between the user equipment unit 473 and a node 412 of the wireless communications network through the mobile communication module 463 associated with the vehicle 474.

In some embodiments, although the user equipment unit 473 is coupled to the mobile communication module 463, the user equipment unit 473 may rely on the service provider associated with the user equipment 473 rather than with the mobile communication module 463 associated with the vehicle. This information may be exchanged initially when the user equipment unit 473 is authenticated and associated with the vehicle 474. Since, paying two wireless bills may not be desirable, using the service provider already associated with the user equipment unit 473, the user may only receive a single bill for the user equipment unit 473 even though sometimes it is connected to nodes in the network through the mobile communication module 463 associated with the vehicle 474.

The use of the service provider associated with the user equipment 473 may also provide the added benefit to the car manufacturer installing the mobile communication module 463 as it relieves the necessity of the car manufacturer being tied to a single service provider.

It will be understood that the mobile communication module 463 is configured to connect to more than one user equipment unit 473 simultaneously. For example, if the vehicle 474 included three passengers, each passenger could be authenticated as discussed above and could establish connections to the network using wireless interfaces associated with the mobile communication module 463. Furthermore, each passenger could use a different service provider so that their usage while in the vehicle 474 would appear on the same bill as their normal mobile usage associated with their user equipment unit 473.

Thus, a second user equipment unit 473 may be connected to the vehicle 474. The second user equipment unit 473 may be authenticated and associated as discussed above. A second wireless interface of the mobile communication module 463 may be activated based on connection credentials received from the second user equipment unit 473. A local wireless connection may be established between the second user equipment unit 473 and the mobile communication module 463 associated with the vehicle 474 using the second wireless interface.

As is clear from FIGS. 3 and 4, the vehicle 474 having the associated mobile communication module 463 moves along a path, for example, a road or highway. Thus, the mobile communication module 463 is configured to establish wireless connections with different network nodes associated with different types of wireless networks along the path. In some embodiments, the handoffs between the networks along the path are facilitated by an intermediary device, for example, intermediary device 453 of FIG. 4. In some embodiments, the intermediary device 453 is in control of all the nodes on the path of the vehicle, for example, 3G, LTE, WLAN and the like. The mobile communication module 463 is configured to periodically provide information to the intermediary device 453. For example, the mobile communication module 463 may provide the location of the vehicle, the speed of the vehicle, the destination of the vehicle, as well as any other parameters which can help enrich the driver's experience and safety. The intermediary device 453 then uses this information to control connectivity of the mobile communication module 463 to nodes 412 of the wireless communications network along the path of the vehicle.

For example, as will be discussed further with respect to FIG. 7, the intermediary device 453 may be configured to detect areas along the path that do not have any type of network coverage and to buffer a predetermined number of packets before the vehicle 474 enters the detected areas so that the connection to the wireless communication system is not interrupted. The intermediary device 453 may be configured to pre-provision potential nodes 412 in the wireless communication system along the path so that handoff will be seamless and connectivity is not interrupted. Pre-provisioning may include pre-provisioning the nodes on the path with the correct credentials identifying the vehicle 474 and the associated mobile communication module 463 so that secure vehicle to infrastructure communication with the required level of anonymity and unlinkability can be established. Since the intermediary device 453 is in control of all the nodes 412 on the path and can communicate with the mobile communication module 463, the intermediary device 453 may be further configured to configure the at least one interface of the mobile communication module 463 with the proper network parameters for the potential nodes on the path, which also may contribute to seamless handoff and ensure that connectivity is not interrupted. In other words, the intermediary device 453 has access to the mobile communication module 463 in the vehicle 474 and can configure/reconfigure all of the interfaces associated therewith with the proper network parameters, for example, IP addresses.

It will be understood that the intermediary device 453 is an optional element of the system 400. However, since the mobile communication module 463 does not have control of all of the nodes along the path of the vehicle 474, embodiments lacking the intermediary device 453 may experience more loss of connectivity while the vehicle 474 is moving along the path. In embodiments including the intermediary device, the intermediary device 453 is fully aware of the connectivity context surrounding the vehicle 474 and can take the necessary actions to address networking, security and privacy issues for both vehicle to vehicle and vehicle to infrastructure communications.

An exemplary situation for which the inclusion of the intermediary device 453 may improve connectivity is a car accident along the intended path of the vehicle 463. When there is an accident or construction on a road, the number of cars on a small area is at its maximum and the radio base stations 412 around that area become very overloaded. Since the intermediary device 453 is fully aware of all of the overload situation, the intermediary device 453 can pre-provision other nodes (RBSs) that are not so overloaded. Thus, the use of intermediary device 453 may provide better connectivity and with minimum latency for the user equipment units 473 in the vehicle 474.

Since the mobile communication module 463 associated with the vehicle 474 cannot have a full picture of what wireless nodes are around it, using an intermediary device 453 to control the wireless interfaces of the mobile communication module 463 would lead to a better utilization of the available technologies at any point in time.

Figure 5:
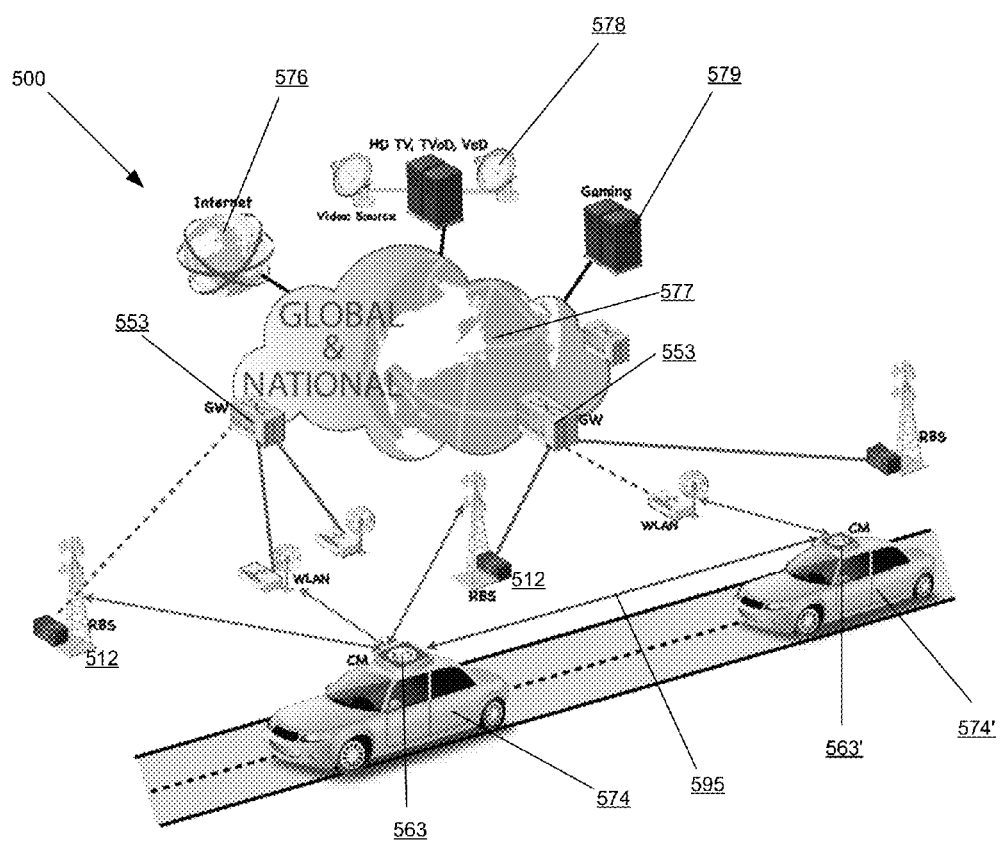
FIG. 5 is a block diagram illustrating a wireless network including multiple mobile communication modules in accordance with some embodiments of the present invention.

Referring now to FIG. 5, a wireless communications network 500 including a split architecture model in accordance with some embodiments of the present invention will be discussed. As illustrated in FIG. 5, the wireless communications network 500 includes first and second vehicles 574, 574' having associated first and second mobile communication modules 563, 563', various network nodes 512 of various wireless technologies, for example, WLAN, LTE, 3G and the like. Each of these nodes 512 is connected to a core network (network cloud) 577 through a gateway (GW) 553. The gateway 553 connects the nodes to other services in the core network 577, for example, the Internet 576, Video sources (HD TV, TVoD, VoD) 578, gaming resources 579 and the like. The split architecture model implemented between the gateways 553 and the mobile communication module 563, 563' switch allows better control and configuration of corresponding wireless interfaces depending on location data sent by the vehicle 574, 574' to a central sever and on the ongoing traffic.

In particular, split architecture would allow the network to efficiently deal with frequent handoffs and roaming, i.e. as they can be expected and pre-planned; empty pockets as they can be discovered and the gateways 553 can serve as proxies; security, anonymity and unlinkability as the intermediary device can pre-provision all necessary infrastructure devices without relying on certificates, i.e. remove DoS attacks; quality of service and content distribution; and facilitating vehicle to vehicle 595 communication as it can be established through the intermediary device. Implementing a split architecture between the gateways 553 and the mobile communication module 563, 563' allows the focus to be shifted onto the connectivity side only instead of having to run complex and dedicated protocols.

Figure 6:
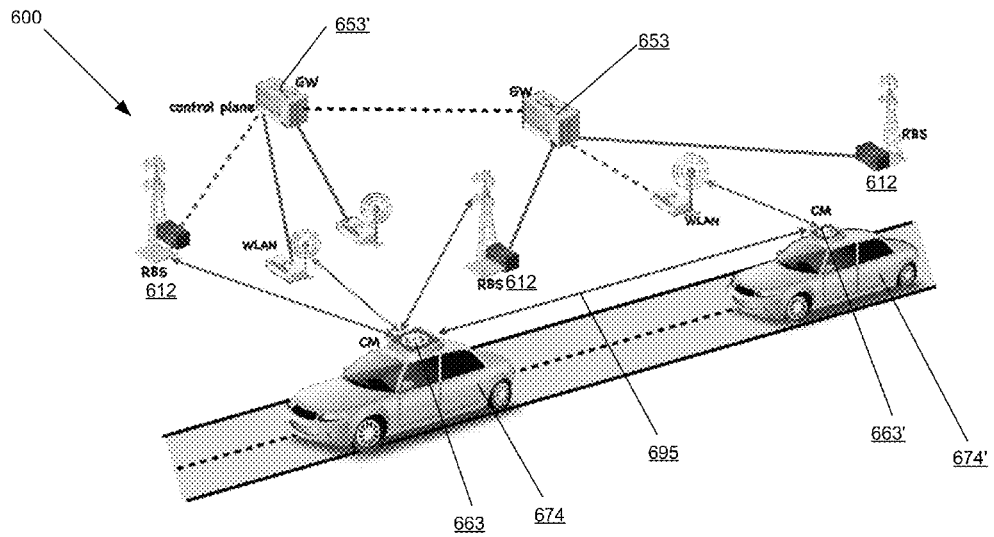
FIG. 6 is a block diagram illustrating a wireless network including multiple mobile communication modules and various intermediary devices in accordance with some embodiments of the present invention.

Referring now to FIG. 6, a wireless communications network 600 including a split architecture model in accordance with some embodiments of the present invention will be discussed. As illustrated in FIG. 6, the wireless communications network 600 includes first and second vehicles 674, 674' having associated first and second mobile communication modules 663, 663', various network nodes 612 of various wireless technologies, for example, WLAN, LTE, 3G and the like. Enabling the car to interact efficiently with the infrastructure (vehicle to infrastructure) in an efficient way is not a unidirectional process. Thus, the communication infrastructure is adapted to efficiently cooperate with the mobile communication module 663, 663' according to its needs and requirements in accordance with some embodiments discussed herein. In some embodiments, in order to enable the bidirectional cooperation, the split architecture is also applied between the gateways 653, 653' and the relays, for example, RBS 612, WLAN and the like.

As illustrated in FIG. 6, the split architecture provides efficient predictive handoff by implementing "n-casting." Depending on the nature of exchanged traffic, the gateway 653, 653' is configured to determine the exact value of "n" and reconfigure the mobile communication module 663,663' as well as the corresponding access node(s) in order to assist the mobile control module 663,663' during the handoff. The split architecture in accordance with some embodiments allows the mobile communication module 663, 663' to be configured in order to enable seamless handoff between different interfaces.

Figure 7:
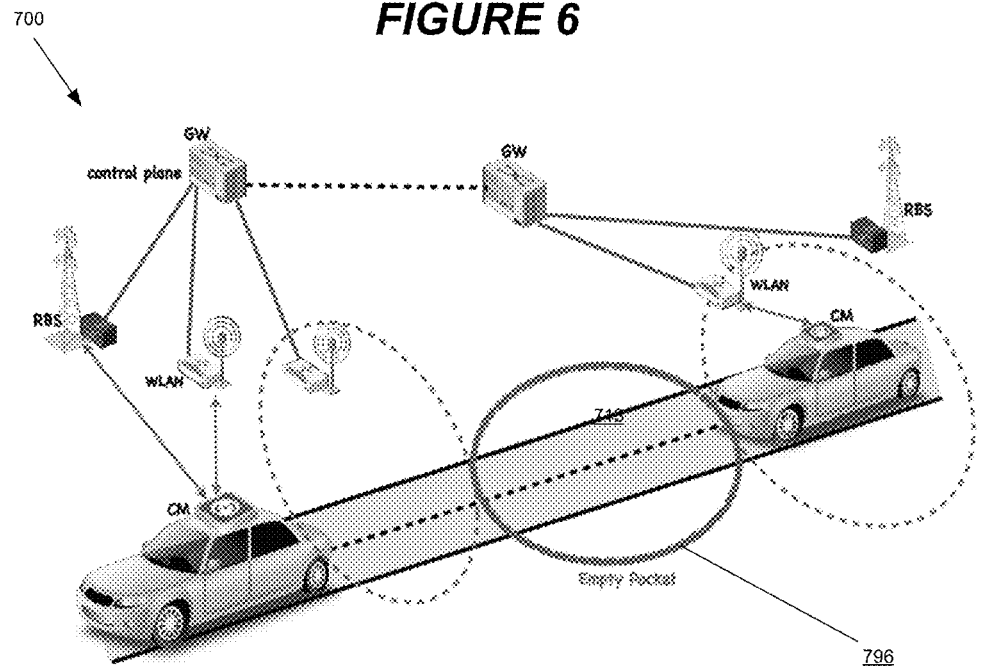
FIG. 7 is a block diagram illustrating a wireless network including multiple mobile communication modules in accordance with some embodiments of the present invention.

Referring now to FIG. 7, a block diagram illustrating a delay tolerant wireless network in accordance with some embodiments of the present invention will be discussed. As illustrated in FIG. 7, the network 700 includes an empty pocket 713 where there is no coverage. In some embodiments of the present invention, the network 700 is a delay tolerant network. In particular, an intermediary device may know of the empty pocket 713 on the path of the vehicle as discussed above. Thus, a particular number of packets may be buffered so that when the vehicle reaches the empty pocket 713, there is no interruption in the connection. Since the speed of the vehicle and the size of the empty pocket are known by the intermediary device, the particular number of packets needed to make it through the empty pocket 713 without losing connectivity can be calculated.

Figure 8:
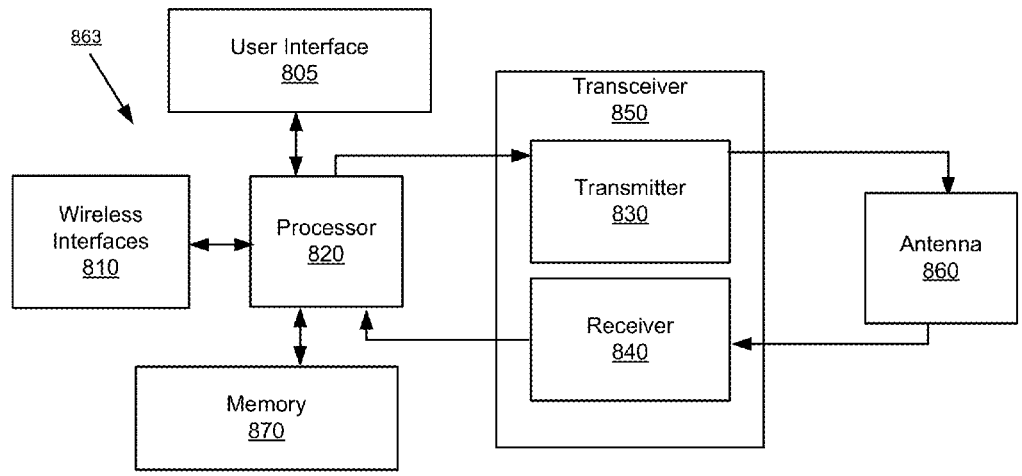
FIG. 8 is a block diagram illustrating a mobile communication module in accordance with various embodiments of the present invention.

FIG. 8 is a block diagram illustrating a mobile communication module 863 in accordance with various embodiments of the present invention. As illustrated, the mobile communication module 863 includes at least one wireless interface 810, a processor 820, a transmitter 830, a receiver 840, an antenna 860 and a user interface 805. The transmitter 830 and receiver 840 may be at least partially combined in a transceiver 850. The antenna 860 may include one or more antennas that communicate with the transceiver 850 through one or more antenna posts. The processor 820 may process voice/data communications transmitted through the transmitter 830 and antenna 860 and received through the antenna 860 and receiver 840. The user interface 805 may include one or more speakers, microphones, keypads, displays, touch-sensitive displays, etc., to support radiotelephone voice communication, Internet browsing, text messaging, email, etc. The receiver 840 and the antenna 860 may be further configured to receive GPS and/or other positioning signals, and the processor 820 may be configured to process these positioning signals and/or to transmit these signals through the transmitter 830 and antenna 860 to the node 112. Instructions and/or data that are used by the processor 820 may be stored in one or more memories 870.

The transceiver 850 may be further configured to receive connection credentials from a user equipment unit plugged into the vehicle if the user equipment unit is authenticated. The processor 820 may be further configured to activate at least one wireless interface of the mobile communication module responsive to the received connection credentials and establish a local wireless connection between the user equipment unit and the mobile communication module associated with the vehicle using the at least one wireless interface.

In some embodiments, the processor 820 may be further configured to establish a wireless connection between the user equipment unit and a node of the wireless communications network. In certain embodiments, the processor 820 may be configured to establish the wireless connection using a service provider associated with the user equipment unit. Thus, as discussed above, the user may only receive one bill for both the user equipment unit and the use of the mobile communication module.

The processor 820 may be further configured to periodically provide information from the mobile communication module to an intermediary device positioned in the wireless communications network. The information may include at least location information associated with the mobile communication module, a speed of the vehicle, and a destination of the vehicle. The intermediary device may be configured to control connectivity of the mobile communication module to nodes of the wireless communications network along the path.

Figure 9:
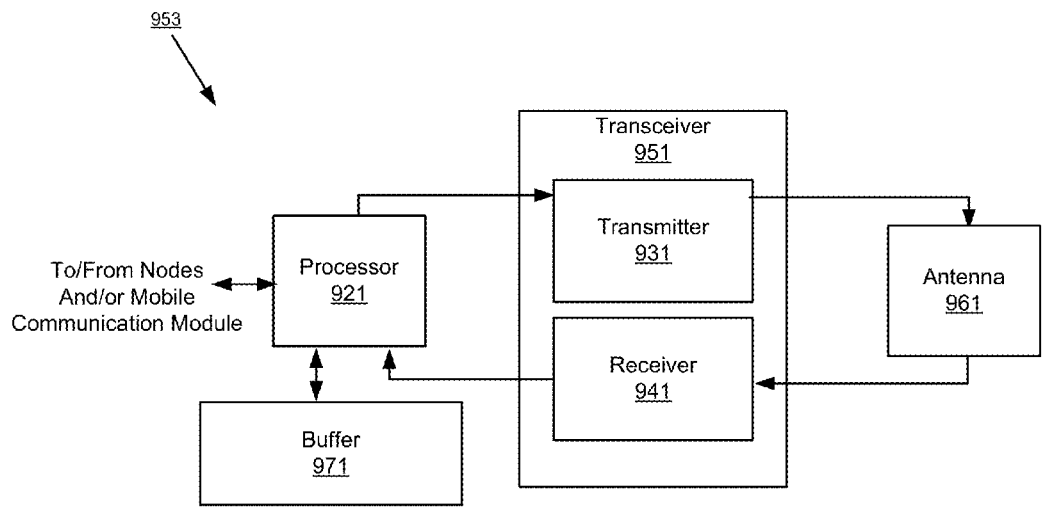
FIG. 9 is a block diagram illustrates a intermediary device in a wireless network in accordance with various embodiments of the present invention.

FIG. 9 is a block diagram illustrating an intermediary device/gateway in accordance various embodiments discussed herein. As illustrated in FIG. 9, the intermediary device 953 may include a processor 921, a transmitter 931, a receiver 941, a buffer 971 and an antenna 961. The transmitter and receiver may be at least partially combined in a transceiver 951. The antenna 961 may include one or more antennas that communicate with the transceiver 951 through one or more antenna ports. The processor 921 may be coupled to the core network and/or to other nodes 112. The processor 921 may also process voice/data communication transmitted through the transmitter 931 and antenna 961, and received through the antenna 961 and receiver 941 to support communication with a plurality of user equipment.

The radio transceiver 951 may be further configured to receive information associated with a mobile communication module associated with a vehicle moving along a path, wherein the information includes at least location information associated with the mobile communication module, a speed of the vehicle, and a destination of the vehicle. The radio transceiver 951 may be further configured to receive information associated with nodes of the wireless communications network along the path, the information including network traffic information associate with the nodes along the path.

The processor 921 may be further configured to control connectivity of the mobile communication module to the nodes of the wireless communications network along the path of the vehicle based on the received information associated with the mobile communication module and associated with the nodes along the path. In some embodiments, the processor 921 is further configured to detect areas along the path that do not have any type of network coverage and to buffer a predetermined number of packets before the vehicle enters the detected areas so that the connection to the wireless communication system is not interrupted.

In certain embodiments, the processor is further configured to control connectivity by pre-provisioning potential nodes in the wireless communication system on the path and to configure at least one interface of the mobile communication module with proper network parameters for the potential nodes on the path.

Figure 10:
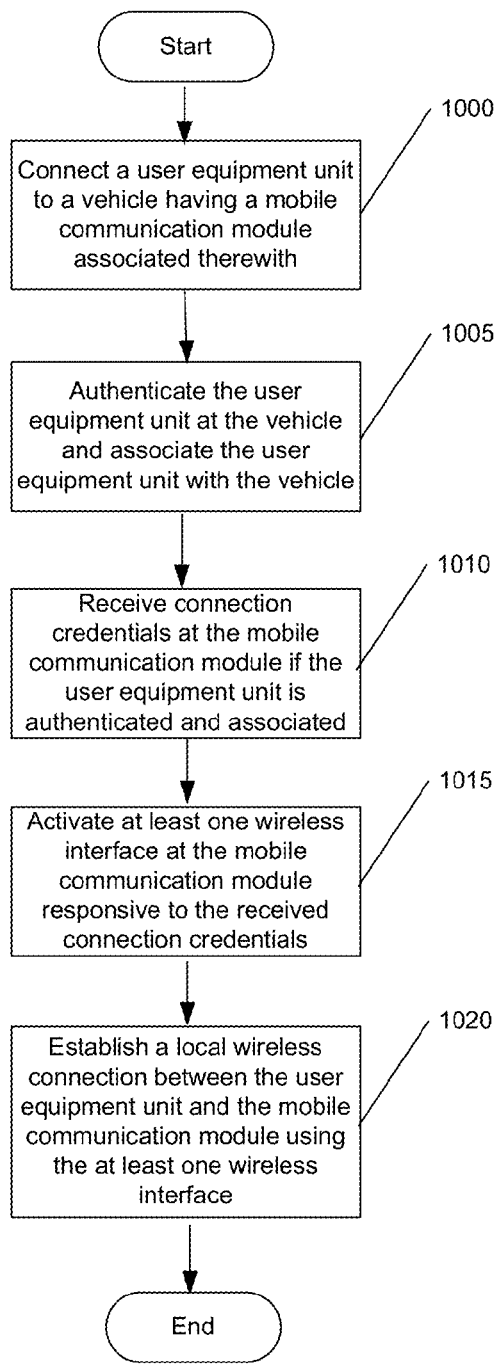
FIGS. 10-13 are flowcharts of operations that may be performed to assign radio resources in a wireless communications network in accordance with various embodiments of the present invention.

Referring now to FIGS. 10-13, flowcharts illustrating operations that may be performed to assign radio resources in a wireless communications network in accordance with various embodiments of the present invention will be discussed. Referring first to FIG. 10, operations begin at block 1000 by connecting a user equipment unit to a vehicle having a mobile communication module associated therewith. The user equipment unit is authenticated at the vehicle and the user equipment unit is associated with the vehicle (block 1005). Connection credentials are received at the mobile communication module from the user equipment unit if the user equipment unit is authenticated and associated (block 1010). At least one wireless interface is activated at the mobile communication module responsive to the received connection credentials (block 1015). A local wireless connection is established between the user equipment unit and the mobile communication module associated with the vehicle using the at least one wireless interface (block 1020).

Figures 11, 12:
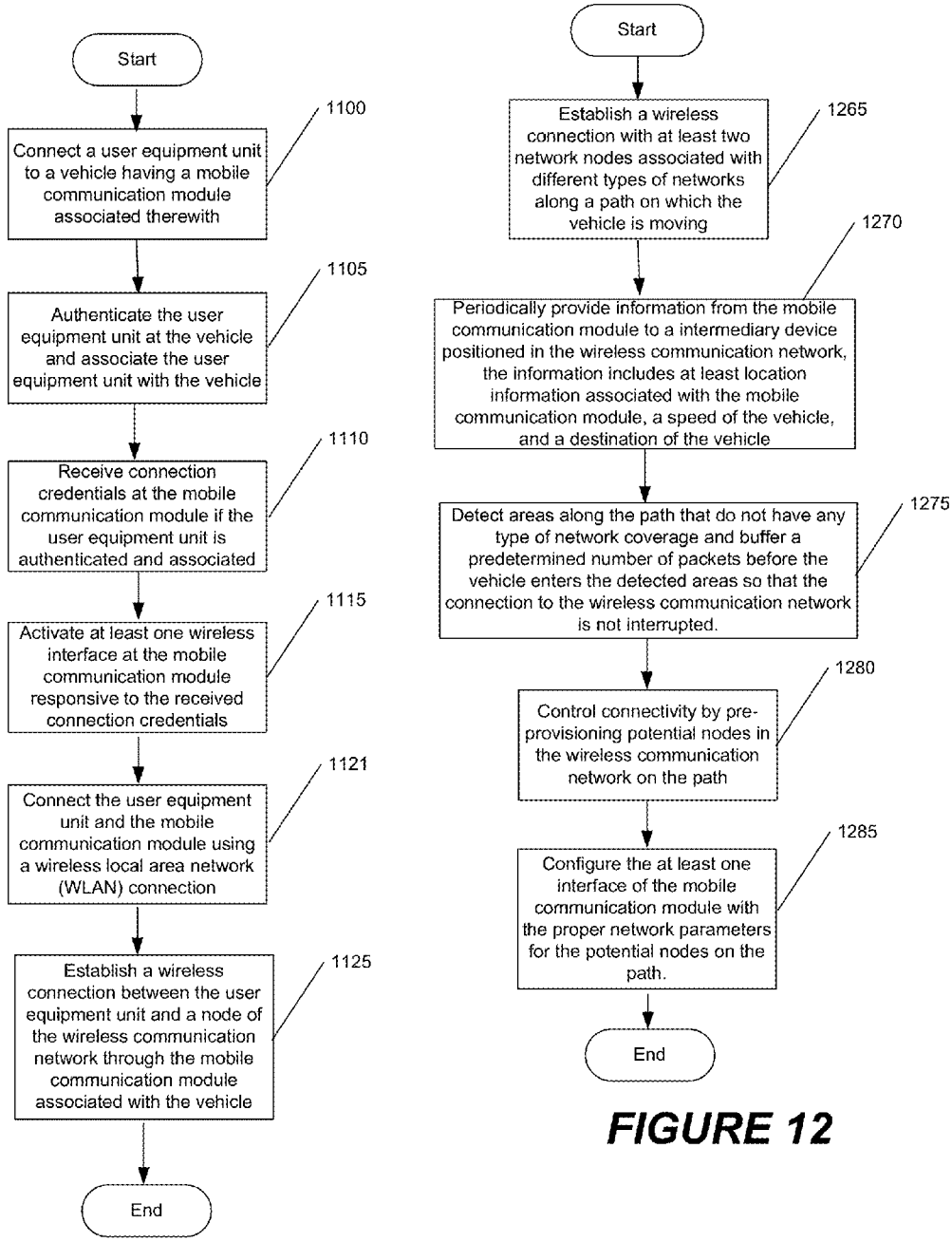

Referring now to FIG. 11, operations begin at block 1100 by connecting a user equipment unit to a vehicle having a mobile communication module associated therewith. The user equipment unit is authenticated at the vehicle and the user equipment unit is associated with the vehicle (block 1105). Connection credentials are received at the mobile communication module from the user equipment unit if the user equipment unit is authenticated and associated (block 1110). At least one wireless interface is activated at the mobile communication module responsive to the received connection credentials (block 1115). Connect the user equipment unit to the mobile communication module using a wireless local area network (WLAN) connection (block 1121). Establishing a wireless connection between the user equipment unit and a node of the wireless communications network through the mobile communication module associated with the vehicle (block 1125).

Referring now to FIG. 12, operations begin at block 1265 by establishing wireless connections with at least two network nodes associated with different types of networks along a path on which the vehicle is moving. Information from the mobile communication module is periodically provided to a intermediary device positioned in the wireless communications network (block 1270). The information may include at least location information associated with the mobile communication module, a speed of the vehicle, and a destination of the vehicle. The intermediary device may be configured to control connectivity of the mobile communication module to nodes of the wireless communications network along the path.

Areas may be detected along the path that do not have any type of network coverage and a predetermined number of packets may be buffered before the vehicle enters the detected areas so that the connection to the wireless communication system is not interrupted (block 1275). Connectivity may be controlled by pre-provisioning potential nodes in the wireless communication system on the path (block 1280). The at least one interface of the mobile communication module may be configured with the proper network parameters for the potential nodes on the path (block 1285).

Figure 13:
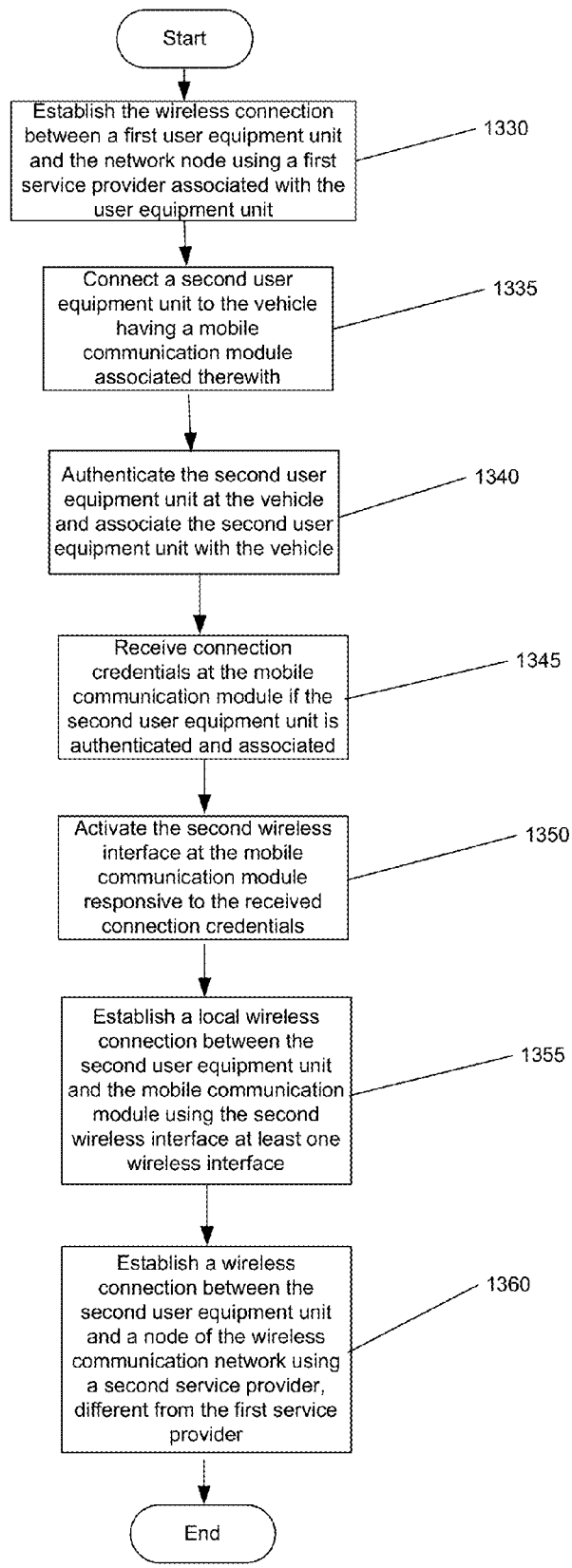

Referring now to FIG. 13, operations begin at block 1330 by establishing the wireless connection between a first user equipment unit and the node of the communications network using a service provider associated with the first user equipment unit. Connect a second user equipment unit to the vehicle having a communication module associated therewith (block 1335). Authenticate the second user equipment unit at the vehicle and associate the second user equipment unit with the vehicle (block 1340). Receive connection credentials at the mobile communication module from the second user equipment unit if the user equipment unit is authenticated and associated (block 1345). Activate the second wireless interface at the mobile communication module responsive to the received connection credentials (block 1350). Establish a local wireless connection between the second user equipment unit and the mobile communication module associated with the vehicle using the second wireless interface (1355). Establish a wireless connection between the second user equipment unit and a node of the communications network using a service provider associated with the second user equipment unit, the service provider associated with the second user equipment being different from a service provide associated with the first user equipment.

As discussed above, some embodiments of the present invention, enable SIM card virtualization so that a user can use the mobile communication module associated with the vehicle while being charged on his/her own existing account. It will be understood that this element of the present invention may not be provided by a soft-SIM since the user will typically have a SIM card running the UE unit, for example, the mobile terminal, and only a specific set of rules and policies need to be downloaded in the mobile communication module in order to activate the user connectivity and take care of the billing and charging. As discussed above, more than one user is able to connected to the mobile communication module at the same time and use the mobile communication module as if it was his own device.

As further discussed above, some embodiments of the present inventive concept enable infrastructure controlled predicted mobility and multi-homing where a centralized intelligence, for example, the intermediary device, controls switches that are attached to base stations and/or access points. When combined with "fresh" navigation parameters (sent by the vehicle), some embodiments of the present inventive concept may allow the intermediary device to configure different interfaces in order to enable a seamless, fast and smooth handoff as discussed in detail above.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the term Radio Access Technology (RAT) may include, for example, operations in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1710 MHz to about 1785 MHz and about 1805 MHz to about 1880 MHz. PDC operation can include transmission in frequency ranges of about 893 MHz to about 953 MHz and about 810

MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in embodiments according to the invention.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

For purposes of illustration and explanation only, various embodiments of the present invention were described herein in the context of user equipment (e.g., "wireless user terminal(s)", "wireless communication terminal(s)", "wireless terminal(s)", "terminal(s)", "user terminals)", etc.) that are configured to carry out cellular communications (e.g., cellular voice and/or data communications). It will be understood, however, that the present invention is not limited to such embodiments and may be embodied generally in any wireless communication terminal that is configured to transmit and receive according to one or more RATs. Moreover, "user equipment" is used herein to refer to one or more pieces of user equipment. Acronyms "UE" and "UEs" may be used to designate a single piece of user equipment and multiple pieces of user equipment, respectively.

As used herein, the term "user equipment" includes cellular and/or satellite radiotelephone(s) with or without a multi-line display; Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "user equipment" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the terms "node" or "base station" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of assigning radio resources in a wireless communications network with user equipment, the method comprising:
connecting a user equipment unit to a vehicle having a mobile communication module associated therewith;
authenticating the user equipment unit at the vehicle and associating the user equipment unit with the vehicle;
receiving connection credentials at the mobile communication module from the user equipment unit if the user equipment unit is authenticated and associated;
activating at least one wireless interface at the mobile communication module responsive to the received connection credentials;
establishing a local wireless connection between the user equipment unit and the mobile communication module associated with the vehicle using the at least one wireless interface;
establishing a wireless connection between the user equipment unit and a node of the wireless communications network through the mobile communication module associated with the vehicle, wherein when the vehicle having the associated mobile communication module is moving along a path, the mobile communication module is configured to establish wireless connections with at least two network nodes associated with different types of networks along the path;
periodically providing information from the mobile communication module to a intermediary device positioned in the wireless communications network, wherein the information includes at least location information associated with the mobile communication module, a speed of the vehicle, and a destination of the vehicle; and wherein the intermediary device is configured to control connectivity of the mobile communication module to nodes of the wireless communications network along the path, and wherein the intermediary is configured to detect areas along the path that do not have any type of network coverage and to buffer a predetermined number of packets before the vehicle enters the detected areas so that the connection to the wireless communication system is not interrupted.

2. A method of assigning radio resources in a wireless communications network with user equipment, the method comprising:
connecting a user equipment unit to a vehicle having a mobile communication module associated therewith;
authenticating the user equipment unit at the vehicle and associating the user equipment unit with the vehicle;
receiving connection credentials at the mobile communication module from the user equipment unit if the user equipment unit is authenticated and associated;
activating at least one wireless interface at the mobile communication module responsive to the received connection credentials;
establishing a local wireless connection between the user equipment unit and the mobile communication module associated with the vehicle using the at least one wireless interface;
establishing a wireless connection between the user equipment unit and a node of the wireless communications network through the mobile communication module associated with the vehicle, wherein when the vehicle having the associated mobile communication module is moving along a path, the mobile communication module is configured to establish wireless connections with at least two network nodes associated with different types of networks along the path;
periodically providing information from the mobile communication module to a intermediary device positioned in the wireless communications network, wherein the information includes at least location information associated with the mobile communication module, a speed of the vehicle, and a destination of the vehicle, wherein the intermediary device is configured to control connectivity of the mobile communication module to nodes of the wireless communications network along the path, and, wherein the intermediary device is configured to control connectivity by pre-provisioning potential nodes in the wireless communication system on the path.

3. The method of claim 2, wherein the intermediary device is further configured to configure the at least one interface of the mobile communication module with the proper network parameters for the potential nodes on the path.

4. An intermediary device in a wireless communication system, the intermediary device comprising:
a radio transceiver configured to:
receive information associated with a mobile communication module associated with a vehicle moving along a path, wherein the information includes at least location information associated with the mobile communication module, a speed of the vehicle, and a destination of the vehicle;
receive information associated with nodes of the wireless communications network along the path, the information including network traffic information associate with the nodes along the path; and
a processor configured to control connectivity of the mobile communication module to the nodes of the wireless communications network along the path of the vehicle based on the received information associated with the mobile communication module and associated with the nodes along the path, wherein the processor is further configured to detect areas along the path that do not have any type of network coverage and to buffer a predetermined number of packets before the vehicle enters the detected areas so that the connection to the wireless communication system is not interrupted.

5. An intermediary device in a wireless communication system, the intermediary device comprising:
a radio transceiver configured to:
receive information associated with a mobile communication module associated with a vehicle moving along a path, wherein the information includes at least location information associated with the mobile communication module, a speed of the vehicle, and a destination of the vehicle;
receive information associated with nodes of the wireless communications network along the path, the information including network traffic information associate with the nodes along the path; and a processor configured to control connectivity of the mobile communication module to the nodes of the wireless communications network along the path of the vehicle based on the received information associated with the mobile communication module and associated with the nodes along the path, wherein the processor is further configured to control connectivity by pre-provisioning potential nodes in the wireless communication system on the path.

6. The intermediary device of claim 5, wherein the processor is further configured to configure at least one interface of the mobile communication module with proper network parameters for the potential nodes on the path.

* * * * *

UNITED STATES PATENT AND TRADEMARK OFFICE
CERTIFICATE OF CORRECTION

PATENT NO.         : 8,804,619 B2                                      Page 1 of 1
APPLICATION NO.    : 13/198605
DATED              : August 12, 2014
INVENTOR(S)        : Haddad It is certified that error appears in the above-identified patent and that said Letters Patent is hereby corrected as shown below:

In the Specification

In Column 1, Line 46, delete "abuse" and insert -- a base --, therefor.

In Column 2, Line 18, delete "streams:" and insert -- streams; --, therefor.

In Column 2, Line 51, delete "discussed," and insert -- discussed. --, therefor.

In Column 3, Line 28, delete "your" and insert -- four --, therefor.

In Column 3, Line 64, delete "connectivity," and insert -- connectivity. --, therefor.

In Column 6, Line 19, delete ""cellular" telephones)," and insert -- ("cellular" telephones), --, therefor.

In Column 6, Line 34, delete "connectivity," and insert -- connectivity. --, therefor.

In Column 7, Line 57, delete "unit 472" and insert -- unit 473 --, therefor.

In Column 16, Line 41, delete "user terminals)"," and insert -- user terminal(s)", --, therefor.

Signed and Sealed this
Twenty-fourth Day of March, 2015

Michelle K. Lee
*Director of the United States Patent and Trademark Office*